July 30, 1946.  J. E. SHEUMAN  2,404,866
FLOATING TOOL HOLDER
Filed Oct. 3, 1944
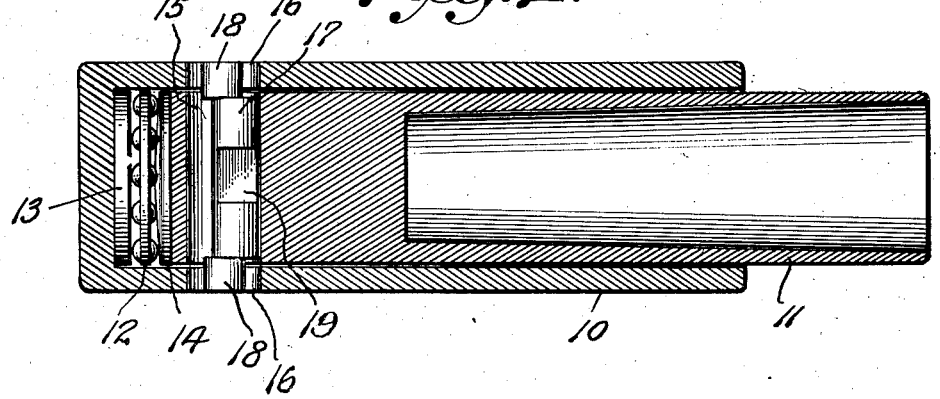
Fig. 1.
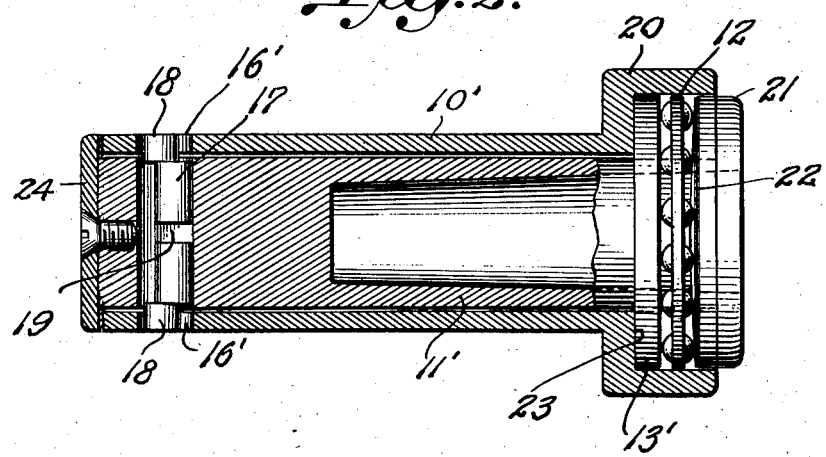
Fig. 2.
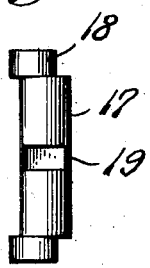
Fig. 3.
Fig. 4.
Fig. 5.
Inventor
J. E. Sheuman
By A. Yates Dowell
Attorney Patented July 30, 1946

2,404,866

UNITED STATES PATENT OFFICE 2,404,866

FLOATING TOOLHOLDER

James E. Sheuman, Waynesboro, Pa.

Application October 3, 1944, Serial No. 557,009

5 Claims. (Cl. 279—16)

This invention relates to tool holders, and more particularly to floating tool holders for use with turret lathes, screw threading machines, drill presses, boring mills and the like, automatic or otherwise, in which it is desired to have the cutting tool follow the work and compensate for a spindle out of alignment due to wear of bearings or errors in the tool shanks, and regardless of whether the tool is used in vertical, horizontal, or other positions, in order that accurate cutting operations may be accomplished by the tools.

The invention is an improvement over the constructions disclosed in my prior patents, No. 1,244,648, granted October 30, 1917, and No. 1,450,822, granted April 3, 1923.

In the first of these patents the pin through which one member is driven from the other engages only one of the diametrically opposed walls of the bushing due to the shifting of the shank eccentrically of the bushing or driving member, and this produces undue wear. In the latter patent while the structure is improved, nevertheless due to the fact that the driving pin is angular at the point of contact there is not the broad, solid, driving engagement desired. Also, there are other features which the present invention seeks to improve.

It is an object of the invention to provide two types of floating tool holders which permit the wide use of standard tools, one type having a straight shank holder without shoulders, and the other type having a shouldered holder for heavier work.

A further object of the invention is to provide a floating tool holder which will allow sufficient movement to compensate for inequalities, or deficiencies of alignment as well as one of simple, durable, efficient and more satisfactory in construction.

Another object of the invention is to provide in a floating tool holder a drive between the shank and the bushing which consists of a driving pin with eccentric end portions which are relatively broad for solid contact with the openings with which the eccentric portions of the pin engage in the bushing, the pin having a rotating instead of a sliding action, and also contacting the driving member the width of the wall instead of having a mere angular contact therewith.

A further object of the invention is to provide a floating tool holder with friction minimized in which the rolling or swivelling action of the conical disc over the balls compensates for angular misalignment and the flat disc likewise compensates for parallel misalignment.

Further objects and advantages of my invention will be apparent from the following specification taken in conjunction with the accompanying drawing, wherein:

Figure 1 is a longitudinal section illustrating one application of the invention;

Fig. 2, a longitudinal section illustrating a further application of the invention;

Fig. 3, a perspective of the driving pin;

Fig. 4, an end elevation of said pin; and

Fig. 5, a side elevation of a conical disc or washer used in the structure of Fig. 1.

Referring to the drawing, the floating tool holder may be the straight shank type, as shown in Fig. 1, or of the shouldered type, as shown in Fig. 2. The straight shank type of holder minimizes over-hang of the tools, it allows unobstructed penetration of a turret, and is especially effective on machines where forward movement of the carriage is constant in all positions of a turret. The absence of shoulders allows closer grouping of the spindles on multiple spindle machines, while a shouldered shank holder is adapted for heavier work.

As shown in Fig. 1, an outer bushing or driving member 10 has fitted loosely therein an inner shank or driven member 11, there being a limited play or relative movement between the two parts in order that the tool carried by the driven member 11 may be centered during the cutting operation when it is in contact with the work.

In order to provide for the end thrust between the driving and driven members, as well as to reduce friction to allow the driven member to move relative to the driving member for the centering effect, a ball bearing 12 is provided between the ends of the driving and driven members, a flat washer 13 being disposed against the bottom of the socket in the outer driving member so that the ball bearing rolls against it. On the opposite side of the ball bearing is a washer 14 having a conical face on one side in engagement with the bearing and a flat face on its other side whic his engaged by the flat end of the inner shank or driven member 11. Thus the axial pressure or thrust between the driving member and the driven member will be taken up by the parts just described.

In order to provide the necessary connection between the driving and the driven members, so that the driven member will be caused to rotate with the driving member, the transverse opening 15 is provided in the driven member and a corresponding pair of openings 16 in the driving member. In these openings there is disposed a driving pin 17 with eccentric end portions 18, providing an improved driving connection between the driving and driven members and affording a broad, solid, contact between the pin and the openings 16 in the bushing. The pin is adapted to rotate instead of slide as in my previous constructions, and also, there is contact between the pin and the bushing or driving member the thickness of the wall instead of a mere angular or line contact.

The driving pin 17 is provided with a slot 19 for the reception of a set screw disposed at right angles to the driving pin for limiting its axial or endwise movement.

Thus with the structure described and illustrated in Fig. 1, angular misalignment is accommodated. The arrangement of parts simplifies the proper alignment of the tool carried by the shank 11. Angular misalignment is accommodated by the rolling or swivelling action of the conical disc 14 over the balls, allowing the shank to tilt easily. Likewise, parallel misalignment or lateral movement of the shank is easily accommodated by the ball bearing moving on the adjacent surface of the disc 13. The washer 13 has flat sides. A positive drive is maintained between the shank and the bushing by the driving pin and its eccentric relatively broad flat end portions, the pin rotating to maintain such positive connection.

The construction shown in Fig. 1 is a straight shank holder for tapered shank tools, while the construction shown in Fig. 2 is a shoulder type holder for tapered shank tools.

Referring to Fig. 2, an outer bushing or driving member 10' has loosely fitted therein an inner shank or driven member 11'. The relative movement or play between the outer bushing or driven member and the inner shank permits the tool carried by the inner shank to center or align with the work during the cutting operation while it is in contact with the work. The drive between the outer bushing and the inner shank is identical to that of the structure of Fig. 1, the outer bushing having aligned apertures 16' to accommodate the eccentric portions 18 of the driving pin 17. The outer bushing 10' is provided with an enlarged head 20 and the inner shank is provided with an enlarged head 21. The enlarged head 20 is adapted to receive an assembly for performing the functions of the assembly between the end of the shank and the bushing in Fig. 1 such assembly comprising a flat washer 13' and a conical washer 22. Thus the bearings and the flat conical washers of the constructions of both Figs. 1 and 2 compensate for angular and parallel misalignment. Angular misalignment is corrected by the action of the conical disc rolling or swivelling over the ball bearings, thus keeping the shank or socket parallel to the flat or front face of the disc or washer at all times. Paralleled misalignment is corrected by lateral movement of the shank which readily follows on account of the bearing rolling over the flat face of the flat washer 13'. At the same time the driving pin will rotate and maintain the driving connection. The washer 24 is fastened to the shank or driven member 11' for the purpose of holding the tool in place when withdrawing the tool from the work.

From the foregoing it will be readily understood that a simple yet improved construction is provided.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A tool holder comprising a bushing, a tool carrying member having a shank fitting loosely therein, said bushing and tool carrying member having registering transverse apertures, a pin having an intermediate portion and one or more eccentric end portions which portions are adapted to have a relatively large surface engagement with said registering apertures, said pin being adapted to rotate and maintain a driving connection between said bushing and said tool carrying member, a thrust bearing between said bushing and tool carrying member, a washer on each side of said bearing, one of said washers presenting a flat surface to the bearing and the other presenting a curved surface to the bearing, said curved and flat surfaces permitting rolling and swivelling action of the tool carrying member in said bushing, the eccentric portions of said pin and the walls defining the openings in the bushing providing relative large contact between the pin and the bushing.

2. A tool holder comprising a bushing, a tool carrying member having a shank fitting loosely in said bushing to allow the tool to swivel or move laterally to align with work, said bushing and tool carrying member having registering transverse apertures, a driving pin located in said apertures and having one or more eccentric end portions offset with respect to each other for engagement with the corresponding surfaces of said registering apertures, a thrust bearing between said bushing and tool carrying member serving to mount said tool carrying member in said bushing, and surfaces in association with said bushing and said tool carrying member presented to said bearing to allow the tool carrying member to freely swivel and move laterally for alignment of the tool with work.

3. In combination with a bushing of a shank mounted for movement in said bushing so that a tool held by the shank may follow the movement of work, an annular bearing for receiving the end thrust of said shank in said bushing, and said shank presenting a curved surface to said bearing to facilitate swiveling of the shank, said bushing and shank having registering transverse apertures with relatively large surface areas, a driving pin located in said apertures and having relatively large surface areas for engagement with said apertures, one or more of the end portions of said driving pin being disposed eccentrically of the intermediate portion thereof.

4. In combination a bushing, a tool holder having a shank loosely mounted in said bushing to allow a tool to align with the work, said bushing and shank having transverse apertures, a driving pin located in said apertures and having a portion offset from another portion of said pin, a friction reducing roller thrust bearing between said bushing and said tool holder, and surfaces in association with said bushing and tool carrying member presented to said bearing to allow the tool carrying member to freely move for alignment of the tool with the work, said surfaces being flat at one side and arched at the other side of the bearing.

5. In combination a bushing, a tool holder having a shank loosely mounted in said bushing to allow a tool held by said holder to align with the work, said bushing and shank having transverse apertures, a driving pin located in said apertures and having a portion offset from another portion of said pin, a thrust bearing between said bushing and said tool holder, and surfaces in association with said bushing and tool carrying member presented to said bearing to allow the tool carrying member to freely move for alignment of the tool with the work.

JAMES E. SHEUMAN.